UNITED STATES PATENT OFFICE.

ROBERT H. PEAK, OF ORLANDO, FLORIDA.

DENTAL ANODYNE OR LOCAL ANÆSTHETIC.

SPECIFICATION forming part of Letters Patent No. 357,784, dated February 15, 1887.

Application filed July 27, 1886. Serial No. 209,223. (No specimens.)

*To all whom it may concern:*

Be it known that I, ROBERT H. PEAK, of Orlando, in the county of Orange and State of Florida, have invented a new and Improved Dental Anodyne or Local Anæsthetic, of which the following is a full, clear, and exact description.

This invention consists in a new composition of matter for dental purposes, the same being mainly designed to be used for preventing or relieving the pain in sensitive dentine during the process of preparing the cavity of the tooth for the purpose of filling it; also, as a disinfectant and deodorizer for preventing septic action and lessening the liability to trouble usually following a dental operation. Furthermore, if applied to the cavities of dead teeth and the nerve-canals be thoroughly cleansed with the compound before filling the cavities, it will prevent the formation of alveolar abscess after they are filled by destroying the tendency to generate gases in and at the root of the tooth.

The following ingredients, in or about the proportions specified, are used in the preparation of my improved compound or composition: neutral mixture composed of acetic acid and carbonate of ammonia, one-half ounce; salicylic acid, eighty grains; hydrochlorate of cocoaine, eight grains.

The following is the mode of preparation: To produce the neutral mixture I take chemically pure acetic acid and add carbonate of ammonia until an exact neutral mixture is obtained. To this mixture I then add the salicylic acid until thoroughly saturated and filter the whole, and afterward add and mix with the filtered product the hydrochlorate of cocoaine.

I do not restrict myself to the precise proportions here given for the ingredients, but prefer to adopt those I have named.

The compound is to be applied in varied quantities, according to the requirements in each particular case for any or all the purposes hereinbefore specified. When used for preventing or relieving the pain in sensitive dentine during the process of preparing the cavity of the tooth for the purpose of filling it, the compound I have here described will so far relieve the sensitiveness of the dentine as that the dentist will be enabled to prepare or complete the formation of the cavity and to fill the tooth at or during a single sitting.

I am aware that salicylate of cocoaine has before been used. Such, therefore, I do not claim.

Having thus fully described my invention, I claim as new and desire to secure by Letters Patent—

The herein-described compound or composition of matter for dental purposes, consisting of a neutral mixture of acetic acid and carbonate of ammonia, (*Liquor ammonia acetatis,*) salicylic acid, and hydrochlorate of cocoaine, in or about the proportions specified.

ROBERT H. PEAK.

Witnesses:
O. C. PEELER,
W. W. TOWNSEND.